Jan. 22, 1946.　　H. C. YAEGER　　2,393,441
BUSINESS MACHINE
Filed June 28, 1944　　7 Sheets-Sheet 1
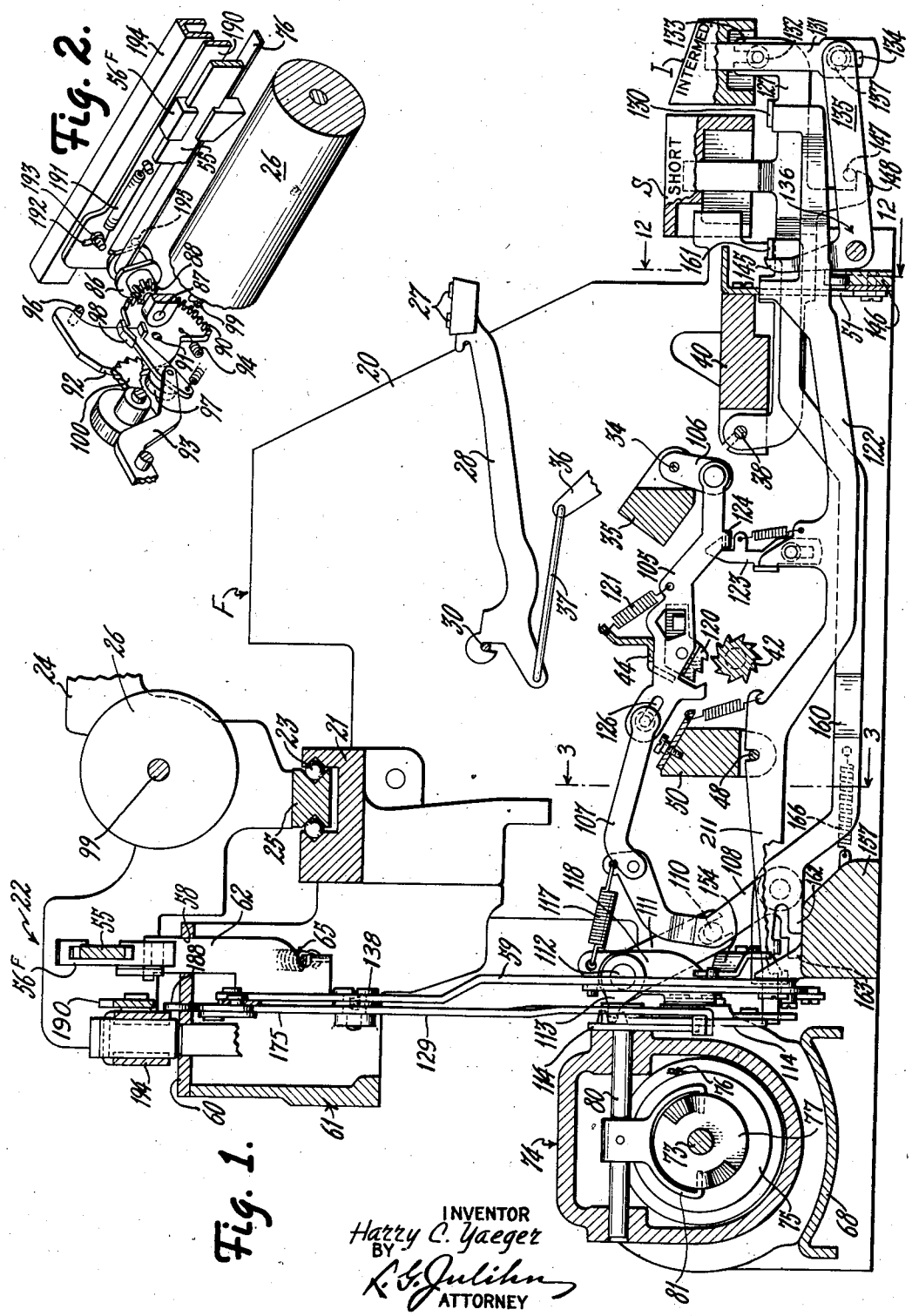
INVENTOR
Harry C. Yaeger
BY
R. G. Julihn
ATTORNEY

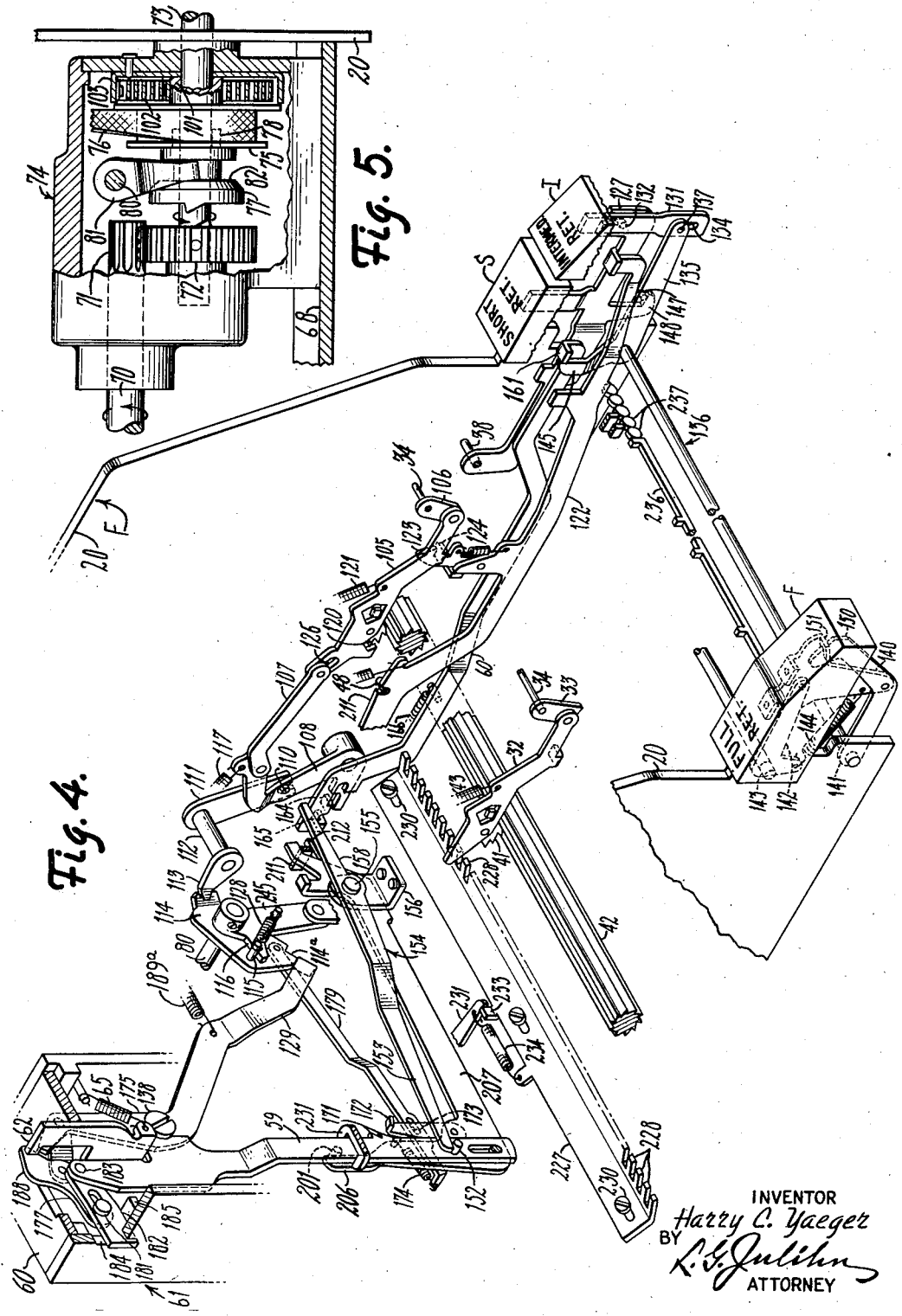

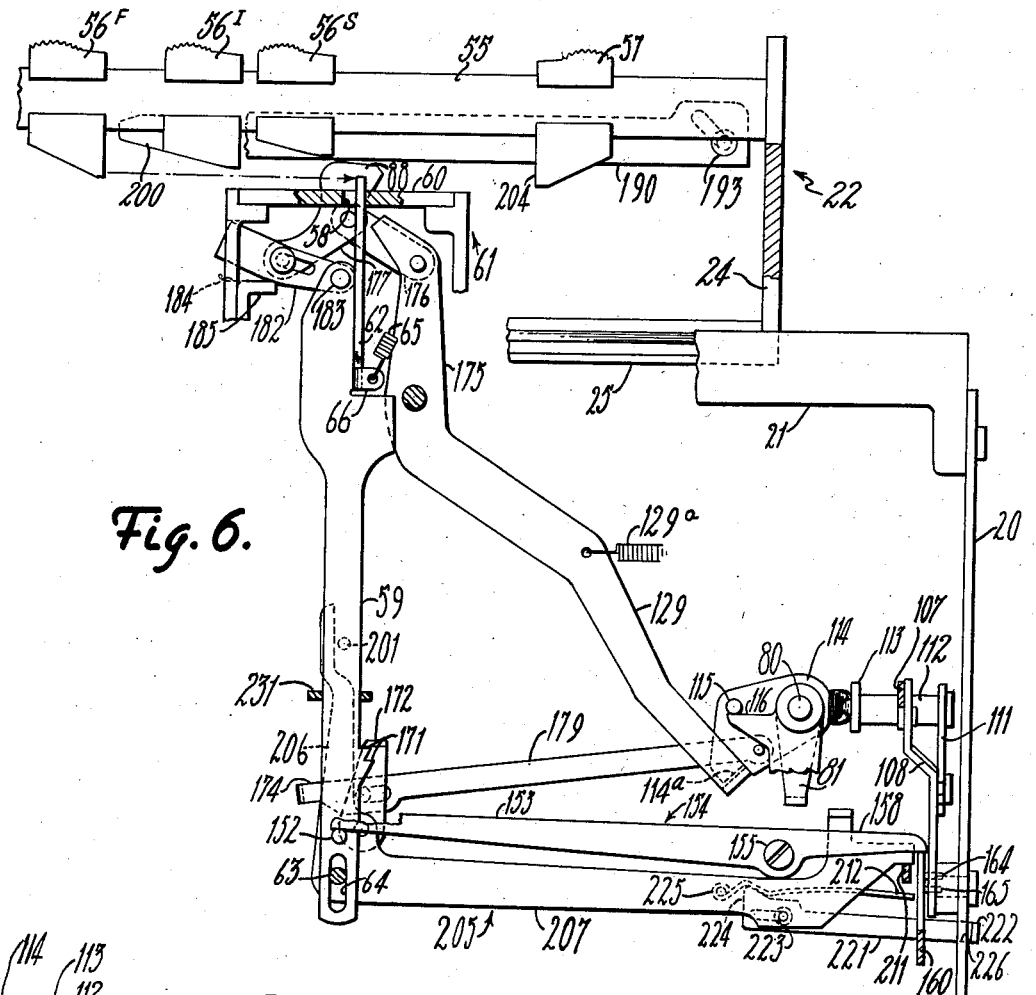

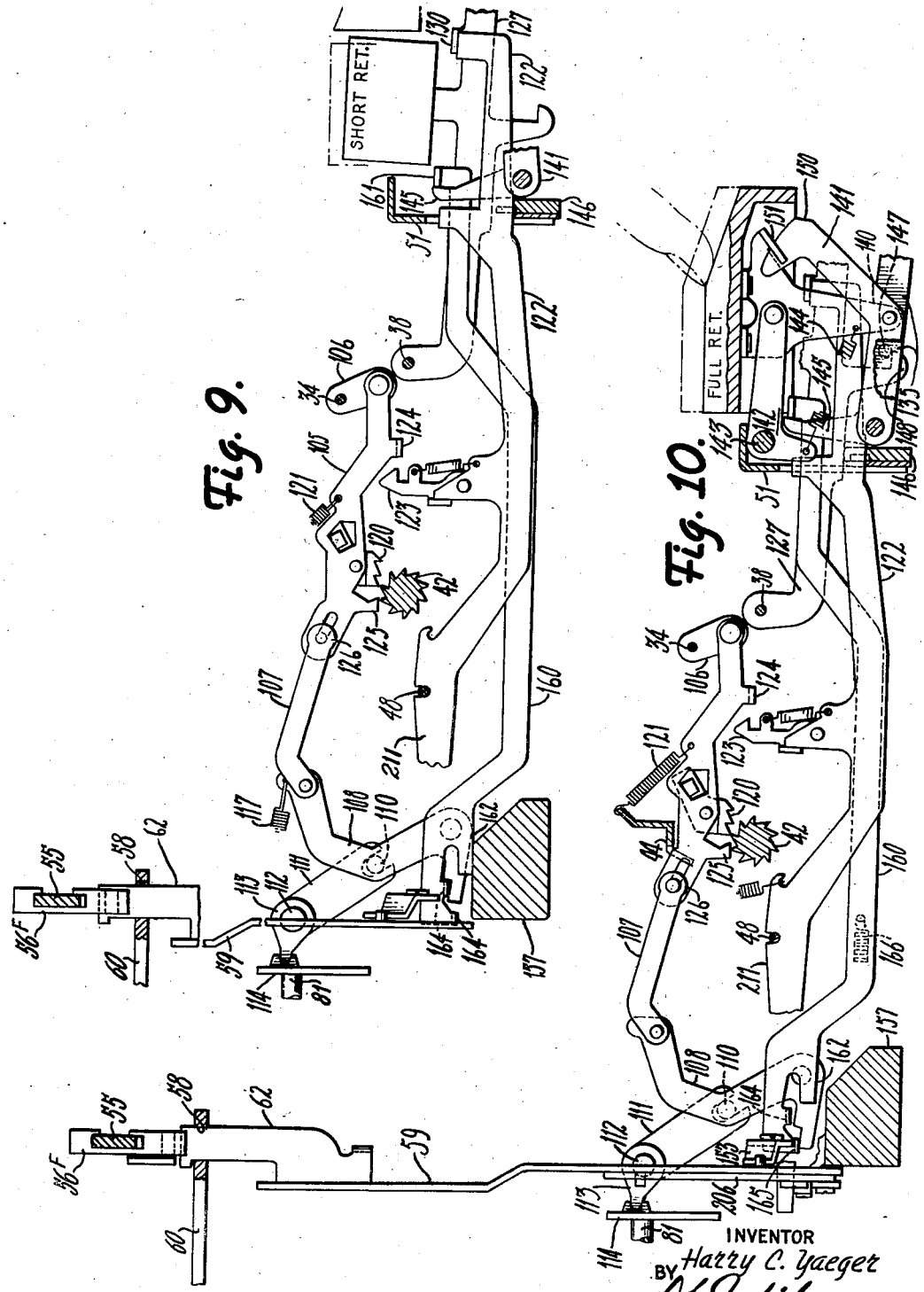

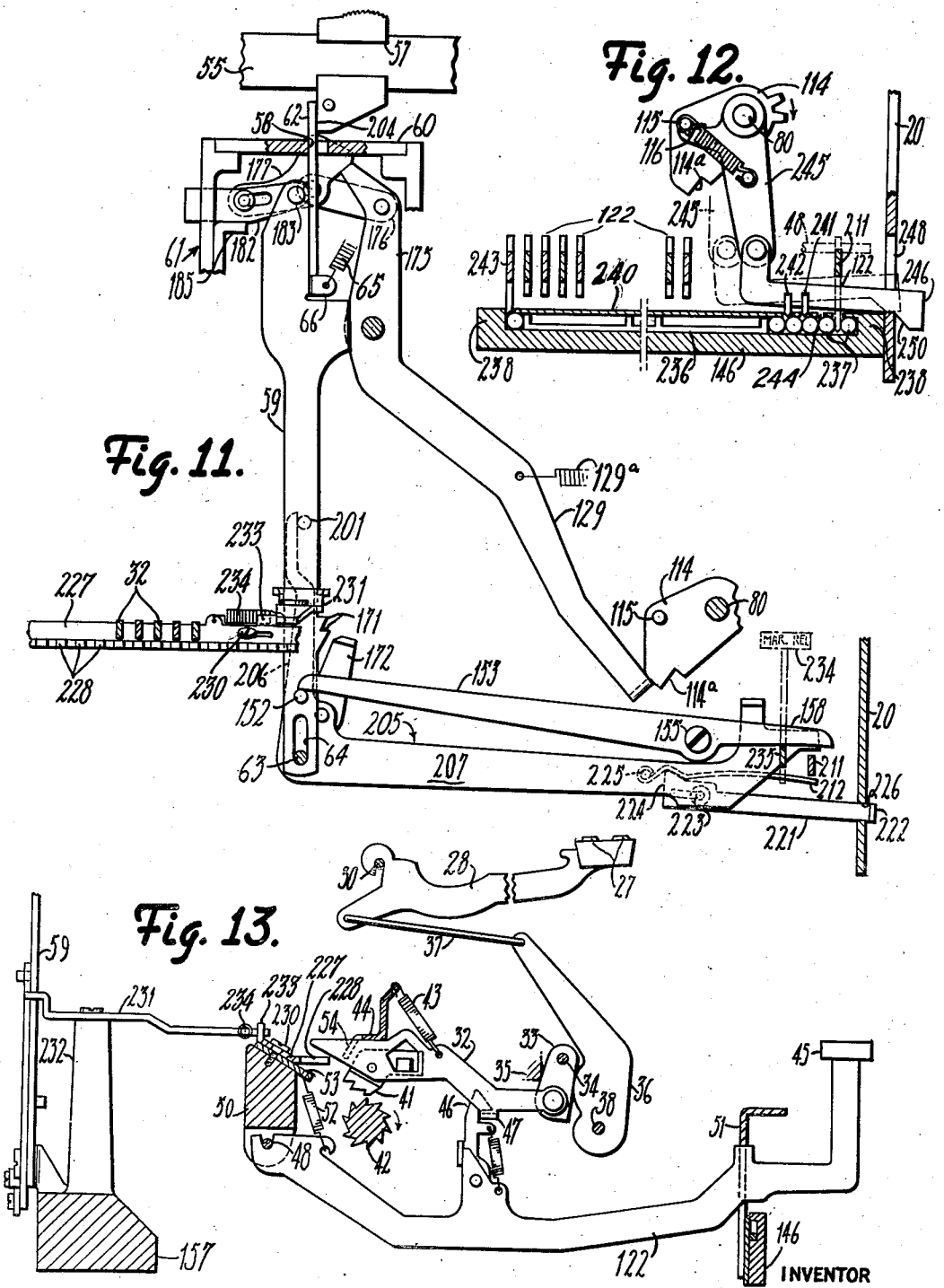

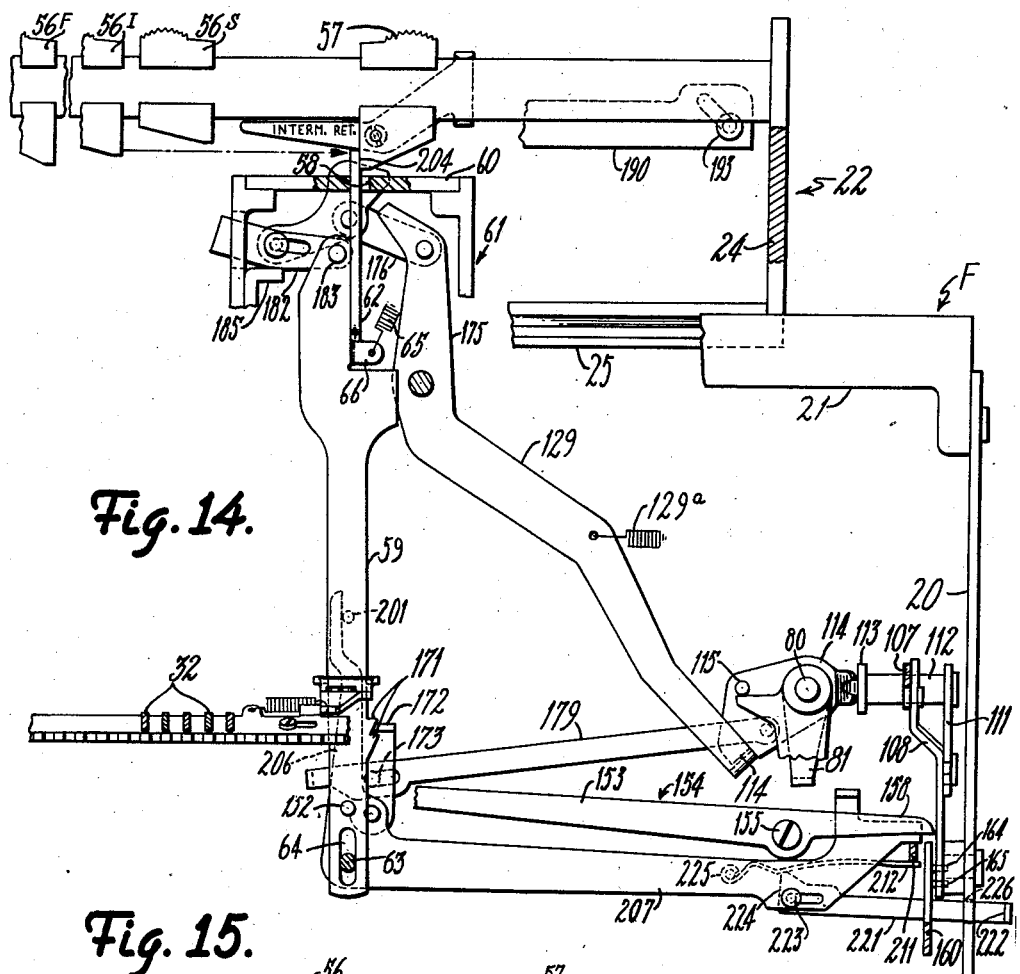
Fig. 14.
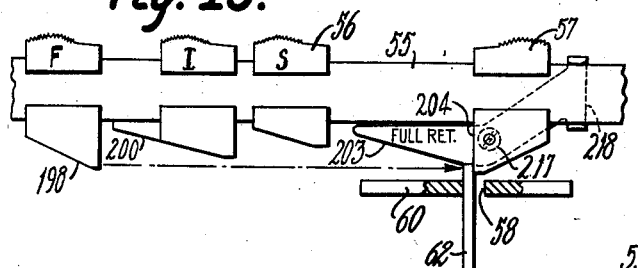
Fig. 15.
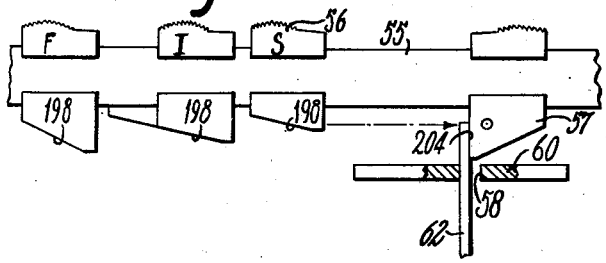
Fig. 16.
Fig. 17.

Patented Jan. 22, 1946

2,393,441

UNITED STATES PATENT OFFICE 2,393,441

BUSINESS MACHINE

Harry C. Yaeger, West Hartford, Conn., assignor to Underwood Corporation, a corporation of Delaware Application June 28, 1944, Serial No. 542,535

24 Claims. (Cl. 197—66)

This invention relates to typewriting and other business machines having a carriage movable on a frame, and with regard to certain more specific features thereof relates to carriage positioning, and particularly also to selective carriage positioning devices such as selective, power-operated carriage returning devices.

The invention in the illustrated form of embodiment herein shown and described is applied to a typewriting machine and discloses various improvements whereby selective motor-operated carriage returns to a plurality of positions, may be efficiently and conveniently realized with expenditure of a minimum of energy and effort on the part of the operator. However, as will be evident to those skilled in the art, some features of the invention are not limited in their application to carriage returning mechanism, but may be advantageously employed also for carriage positioning purposes in general, for example for column selecting tabulation.

It is one of the objects of the invention to provide improved means for power returning a carriage selectively to a number of predetermined positions.

It is another object of the invention to provide carriage return means of the power driven, selective return species, which is efficient in operation and which is suited and constructed for doing versatile work, thus increasing greatly the usefulness of the machine.

Another object of the instant invention is to provide efficient and simple means which through the agency of simple power means and under the control of light-touch, differentially-selective operations of key-means is adapted to institute power returns of the carriage selectively to a number of different, predetermined positions.

A further object of the invention is to devise in connection with manually controllable selective means for returning a carriage to different predetermined positions, efficiently and reliably operative mechanism whereby said carriage return means functions automatically to return the carriage to a particular one of said predetermined positions after the carriage reaches a line-end-defining position.

It is also an object of the invention to provide in combination with means which are selectively settable to establish different positions of arrest for the carriage, efficient power-setting agencies therefor, thus reducing the work and resultant fatigue of the operator to a minimum.

Still a further object of the invention is to contrive improved, efficient, and reliably functioning carriage return drive controlling mechanism embodying power means for effectuating said drive, said power operating means being preferably also utilized to the end of power-conditioning the carriage return mechanism for selected extents of returns.

Many other objects and features will be in part evident and in part pointed out, particularly as the description of a preferred embodiment of the invention proceeds.

Referring now to the drawings:

Figure 1 is a sectional side elevation of a typewriting machine taken along line 1—1 of Figure 3 and embodies most of the mechanism of the invention.

Figure 2 is a front perspective view and depicts the left end of the typewriting machine carriage, having thereon a power line-spacing mechanism built in accordance with the patent to Helmond No. 2,262,676, dated November 11, 1941.

Figure 4 is a skeleton front perspective view, illustrating the devices whereby the machine is conditionable for selective returns, and illustrating also certain locking devices whereby to prevent a misoperation and damage to the machine.

Figure 3:
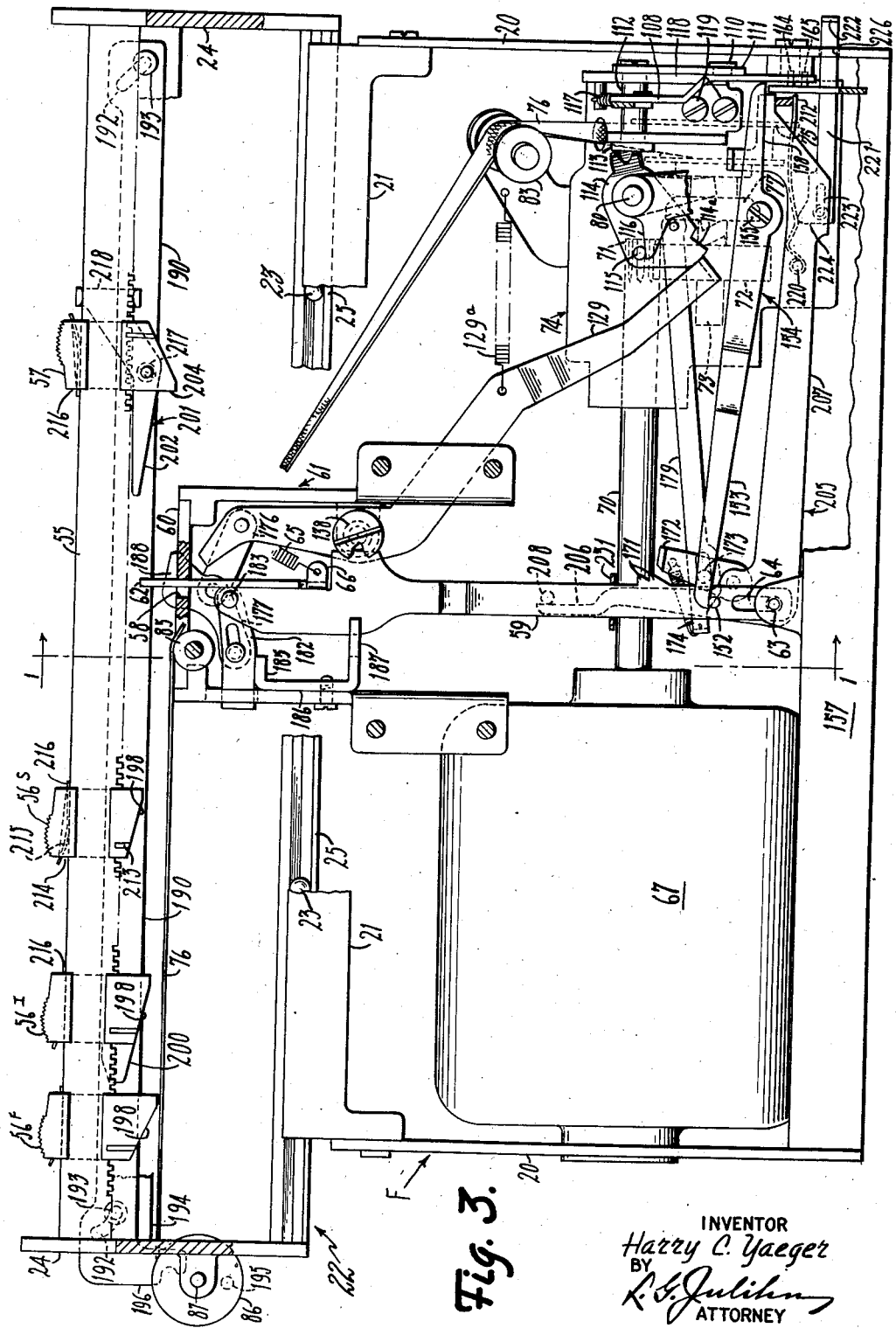
Figure 3 is a sectional front elevation of the mechanism of the invention, taken approximately along line 3—3 of Figure 1.

In Figure 5 is shown in front elevation a part of a carriage return drive contained in a housing and agreeing substantially with that of the said patent to Helmond.

Figure 6 is a skeleton front elevation similar to Figure 3, with the mechanism, by depression of a carriage return key designated Full Ret., conditioned for returning the carriage to an extreme one of three selectable positions.

In Figure 7, which is a fractional side elevation, the return key designated Full Ret. is shown operated and a power mechanism is starting to condition the machine for a full return.

Figure 8 shows in sectional side elevation a transitory condition of the carriage return controlling mechanism which follows depression of a key designated Intermed. Ret.

In Figure 9, which is also a sectional side elevation, the machine has just been conditioned for a short return under the selective control of a key designated Short Ret.

Figure 10 is a view similar to Figure 9 but with the mechanism conditioned for a full return of the carriage.

Figure 11 is a fractional front elevation similar to Figure 3, but depicts the machine in a state for doing regular correspondence work, that is a state in which auomatically initiated carriage returns are eliminated. The view shows the typing instrumentalities locked against operation by advancement of a line-end margin stop to an extreme advanced position.

Figure 12 is a front sectional view taken along line 12—12 of Figure 1, and illustrates a mechanism whereby certain control keys of the machine, other than type keys, are locked against operation during carriage returns and are depressible only one at a time.

Figure 13 shows in side elevation a known power type action and also shows locking means associated therewith.

Figure 14 is a sectional front elevation similar to Figure 3 but travel of the carriage to a line-end position has just conditioned the machine for a return of the carriage to an intermedaite position.

Figure 15 shows in front elevation a series of carriage return stops and a line-end carriage stop, the latter equipped with a control for initiating a power return of the carriage to a full return position.

Figure 16 is similar to Figure 15 but illustrates how a short return is called into operation.

Finally, Figure 17 is a rear elevation of a line-end carriage-stop equipped with modified, adjustable control means whereby automatic carriage returns of predetermined extents may be instituted automatically incidental to the arrival of the carriage in a line-end position.

Referring now more particularly to Figures 1 and 3, a machine framework designated as F supports the working parts of the machine and includes spaced, left and right side plates 20 connected by a number of cross members, one of which may consist of a track way 21 along which a carriage 22 travels on anti-friction rollers 23. The carriage 22 is composed of upright members 24 rising from opposite ends of a rail 25, and said members 24 carry rotatably therebetween a platen roller 26 whereagainst types 27 are adapted to strike. The latter are provided on type bars 28 which swing for operation about a curved fulcrum wire 30, in a manner well known in the art.

Associated with the carriage is a usual draw band device, not shown, which continuously tends to advance the carriage in letter-feed direction, leftwardly as seen from the front of the machine. A carriage-feed escapement device, not shown, but of conventional design, controls advance movement of the carriage, said escapement device being capable to hold the carriage in the various letter-feed positions, but permitting at all times return movement of the carriage 22, rightwardly as seen from the front of the machine.

The machine may embody for the type bars 28, power actuating devices, of the character disclosed in the patent to Harry C. Yaeger, No. 2,254,764 of September 2, 1941, and illustrated presently in Figure 13. Said type bar actuating devices comprise for each type bar an actuator element 32 reaching rearwardly from the lower end of a pendant arm 33 and articulated thereto. Said pendant arms are arranged alongside of each other and are fulcrumed on a common pivot wire 34 extending transversely of the machine, said wire being contained in a cross member 35 of the frame work F and having vertical slots cut therein for location and guidance of the pendant arms 33. Forwardly of the pendant arms and in individual rolling contact with front faces thereof are a series of upright levers 36 which have operating connections with the type bars, in the form of pull links 37. The levers 36 are pivoted on a straight transverse pivot wire 38, supported similar to the member 35 by a tie bar 40 having vertical slots, see Figure 1. The actuator elements 32 are disposed in a straight row alongside of each other and have each a snatch pawl 41 normally posed directly over but clear of a transverse, toothed, constantly driven, power shaft 42. The normal disposition of each actuator element 32, together with its snatch pawl, is determined by springs 43 which urge said elements 32 upwardly and rearwardly to the position seen in Figure 13, in which the rear end of each of said elements 32 is gaged against a transverse plate 44, and in which further rearward movement of the actuator element is prevented by the bottoming of the pendant arm 33 in its guide slot.

For rendering said actuator elements 32 selectively active to drive their associated types, each actuator element is adapted to be lowered under control of a type key 45, about its front end, thereby to establish an operating connection between its snatch pawl and the actuating shaft 42. Said type keys 45 are in the form of key levers having hook elements 46 overlying lateral protuberances on the several actuator elements. A common pivot rod 48 supports all said type-key levers 45 at the rear, such rod being contained in a transverse frame member 50. At the front the key levers are guided in vertical slots of a comb plate 51, and are normally abutting the upper limits of the said slots under influence of springs 52 acting upon the key levers near their rear ends and being attached to a common anchorage plate 53. The transverse plate 44 has a downwardly reaching comb portion 54 for guidance of the actuator elements in fixed vertical planes.

It is to be understood that the carriage executes a letter-feed step in response to each actuation of a type bar, as well as also in response to each operation of a space bar, the latter being not shown.

*Line end and carriage return stops*

The carriage end-members 24 mount a toothed rack 55 extending longitudinally of the carriage and such rack has adjustably locatable thereon three carriage return stops, designated, 56$^S$, 56$^I$ and 56$^F$, having different downward reaches. Also supported on the rack 55 is a line-end-defining stop 57.

Protruding through an opening 58 in a horizontal plate 60 supported by a housing 61, is a counterstop 62 which is adapted by selective cooperation with the stops 56$^S$, 56$^I$, 56$^F$ to restrict return travel of the carriage to different limits as defined by these return stops. The housing 61 is secured to the rear of the trackway 21 and thus may be said to form part of the general frame work F of the machine. The counterstop 62, as is best seen in Figures 3 and 4, constitutes the upper end of an upright arm 59 pivoted at its lower end upon a headed stud 63, the arm having a slot 64 through which said stud protrudes, and being normally held in as far an upward position as allowed by the slot 64, by a spring 65 attached to an ear 66. The spring 65, it will be seen from Figure 3, exerts also a pull to the right, and thereby maintains normally the counterstop 62 in engagement with the right side of the plate opening 58. With the counterstop 62 in the normal position seen in Figures 1, 3, and 4, a return movement of the carriage will be terminated by the engagement of the carriage return stop 56ˢ with the counterstop 62. By positioning the counterstop in two progressively lower positions, as will later be set forth, the return of the carriage becomes respectively restricted to positions defined by the return stops 56ᴵ and 56ᶠ, it being noted here that the exponents in the designations 56ˢ, 56ᴵ, and 56ᶠ stand respectively for short return, intermediate return and full return.

From the foregoing it will be seen that the stops 56ˢ, 56ᴵ, 56ᶠ and the counterstop 62 constitute abutments oppositely on the frame and the carriage, and that these abutments, by selectively positioning the counterstop are variously selected for cooperation to establish different limits of return for the carriage.

Power return mechanism

As has been stated hereinbefore, the carriage is normally held stationary under control of the usual escapement device. Return of the carriage to any of the positions defined by the stops 56ˢ, 56ᴵ, 56ᶠ, may be effected selectively under control of keys S, I, and F, depression of these keys causing return of the carriage by motor power respectively to the positions defined by the return stops 56ˢ, 56ᴵ, 56ᶠ.

The machine has an electric motor 67, Figure 3, overlying a bed plate 68, Figure 1, and from said motor extends rightwardly a motor shaft 70 ending in a gear pinion 71, Figure 5, said pinion driving during use of the machine a gear 72 fast on a short spindle or shaft 73. Said gear and pinion 71, 72 are contained in a casing 74 which affords also journals for the shafts 70 and 73.

A flanged pulley 75 is normally loose on the short shaft 73 and has attached thereto, for winding thereon, a carriage-return draw-band or tape 76. The spindle 73 rotates normally without rotating the pulley 75. Said gear 72 has clutch teeth and the pulley 75 has splined thereto a toothed clutch collar 77 which is movable along the spindle 73 from an open clutch position, see Figures 3 and 5, leftwardly to a closed clutch position. The spline connection between the clutch collar 77 and the pulley 75 is represented at 78, Figure 5, and may be formed by one or more splines extending lengthwise of the spindle 73 into spline grooves provided in the bore of the pulley 75. A rock shaft 80, journaled in the casing 74, has fixed thereto a yoke 81 reaching into a circumferential groove 82 of the clutch collar 77. Said rock shaft 80 when turned clockwise of Figure 5 establishes a clutch connection between the gear 72 and the clutch collar 77 and if so turned causes the carriage return strap 76 to wind on the pulley 75.

The strap 76, see Figure 3, passes through an opening in the casing, over a guide pulley 83 supported on an arm extending from the casing, and thence over another guide pulley 85 on the housing 61, to a pulley 86 fixed to a line-space actuating shaft 87 journaled upon the left carriage end piece 24. The said tape 76 is attached to said pulley 86 and normally wound for about a turn thereabout, so that a rightward pull on the tape 76 will rotate said pulley 86 and its shaft 87 clockwise of Figures 2 and 3. A bevel pinion 88 is fixed to said shaft 87 and meshes with a bevel-gear sector 90 which is rotatable about a fulcrum 91 provided on the left carriage end 24. Said sector 90 is integral with a cam 92 adapted to actuate a line-space lever 93 upon anti-clockwise rotation thereof, Figure 2. A spring 94 yieldably acts upon the sector 90 to urge the same to a normal position determined by abutment of the gear sector 90 with a stop 95 on the carriage end. The pulley 86 being geared to the sector 90, it follows that the normal position of the pulley is determined by the engagement of the gear sector 90 with said stop 95. The cam 92 acts upon the line-space lever 93 through the medium of a roller 97 and the lever 93, when actuated, operates a pawl 98 for imparting a line spacing operation to a ratchet wheel 100 fast on the platen shaft 99.

The draw band actuating pulley 75 in the casing 74 has a hub 101, Figure 5, to which is attached the inner end of a spiral take-up spring 102 anchored at its outer end to a stationary drum 103. Said spring 102 serves to rotate the pulley 75 to keep the draw band taut at all times regardless of the position of the carriage. However, in no case is the tension of the take-up spring 102 sufficient to overcome the return spring 94 for the line spacer sector 90.

Whenever the clutch connection is made between the gear 72 and the clutch collar 77, there is imparted a rotative movement to the pulley 75, causing the band 76 to wind on the latter. The pull thus imparted to the band first turns the pulley 86, thereby imparting a line spacing operation to the platen, and upon limited movement of gear sector 90, the band will pick up and draw the carriage 22 rightwardly in carriage return direction.

The power drive and connections to the line-spacing mechanism just described are substantially as disclosed in the aforesaid patent to Helmond. The returns are terminated in response to engagement of any of the aforesaid return stops with the counterstop 62, in a manner to be described later.

The clutch closing yoke 81 is biased to assume normally the open clutch position seen in Figures 3 and 5, but devices are provided whereby, upon depression of any one of the aforesaid carriage return keys S, I, or F, agencies are called into operation to move said yoke to closed clutch position under power supplied by the electric motor 67. As seen in Figures 1 and 4, the constantly driven, toothed power shaft 42 has posed thereover, near its right end, an actuator element 105 similar to those numbered 32 for the type instrumentalities, and is pivotally attached at its front end, for guidance, to a pendant arm 106. At the rear the actuator 105 has a link connection 107 with a bell crank 108 pivotally supported upon the right hand side wall 20 of the machine. Said bell crank 108 has a pin-and-fork connection 110 with an arm 111 which forms part of a rockable structure including also a rock shaft 112 and a rearwardly reaching arm 113, the apex of the latter constituting a gear tooth and being in constant mesh with a toothed element 114 turnably carried on the yoke shaft 80. Said element 114 carries a pin 115 wherewith an arm 116 fast on the yoke shaft 80 is normally in engagement. The parts just described are normally positioned as seen in Figures 1 and 4 under the influence of a spring 117 which exerts a rearward pull upon the bell crank 108. A bracket 118 having spaced journal ears for the shaft 112 and is fastened upon the casing 74 by screws 119. The actuator 105 carries a snatch pawl 120, and a spring 121, exerting an upward and rearward pull on the actuator link 105, maintains the snatch pawl 120 normally in a rearward position, clear of the power shaft 42, the actuator being gaged against the underside of the transverse plate 44.

To bring about an actuation of the actuator 105 by a depression of any one of the several carriage return keys, S, I, or F, the latter are severally adapted to operate a connector mechanism comprising a lever 122 and a hook element 123 rising therefrom and overlying a lateral ear 124 on the actuator link 105. The lever 122 is pivoted on the rod 48 in a manner similar to the type-key levers 45, and when depressed by operation of any one of the carriage return keys, the hook element 123 will lower the snatch pawl 120 into engagement with the toothed power shaft 42, see Figure 7. Inasmuch as the power shaft 42 rotates continuously, there will ensue in the manner depicted in Figures 9 and 10, immediately a forward displacement of the actuator link 105 and this displacement will be transmitted to the yoke shaft 80 by the parts 107 to 114 and by a spring 128 connecting the arm 116 resiliently to follow the toothed element, thereby to effect closure of the carriage return clutch 77. As the yoke assumes closed clutch position, a latch member 129 carried pivotally on a stud 138 on the housing 61, and having an ear normally bearing on a short dwell on the element 114, swings under the tension of a spring 129ª, to place said ear into an obstructing relation with a shoulder 114ª of said element, see Figure 6, thereby to detain the clutch yoke 81 in closed clutch position pending conclusion of the ensuing carriage return. Concomitantly with the actuator link 105 approaching its fully operated position, see Figures 9 and 10, there becomes positioned in the path of an upwardly advancing tooth on the power shaft 42 a spur 125 which is integral with the actuator link 105, and causes the actuator link 105 to be forced upwardly until the snatch pawl 120 finally clears the power shaft 42. In order that the actuator link may return immediately to normal position under the power of the spring 121, independently of the detained mechanism leading to the clutch yoke 81, the link 107 is connected with the actuator 105 by a pin-and-slot connection 126.

The return key S is carried on a lever 127 which is pivoted on the same rod 38 that also serves to pivot the type action levers 36. Said lever 127 has integral therewith an ear 130 overlying the front end of the actuator engaging lever 122, wherefore the latter will be actuated as seen in Figure 9, upon each operation of the key S.

The carriage return key I surmounts a stem 131 from which there extends laterally a headed pin 132 lying in an upwardly forked end of the lever 127 whereon the key S is carried. Said stem 131 is slotted as at 134 and an arm 135, constituting part of a pivoted bail generally designated by the reference character 136, has a headed pin 137 extending through said slot 134. It will be seen that the arm 135 and the lever 127 constitute a guiding linkage for the stem 131 and that upon depression of the key I, the lever 127, and in turn the lever 122, will be operated, lowering thus the actuator link 105 and its pawl 120 for operation by the power shaft 42.

As viewed in Figure 10, also the depression of the full carriage return key F will effect an operation of the actuator engaging lever 122 to cause a carriage return. Said carriage return key F surmounts a leg 140 which has a pivotal connection with an arm 141 forming part of the bail 136. Vertical guidance of the key F is secured by associating with the upper end of the leg 140 a guide arm 142 having a stationary pivotal support as at 143. Normal position of the key F and the bail 136 is established by an arm 145 branching upwardly from the arm 135 and engaging a bar 146, to be later described, under tension of a spring 144 arranged intermediate a pendant portion of the guide link 142 and the said leg 140, see Figure 4. In operating the bail 136 by the key F, see Figure 7, the left bail arm 135 is swung downwardly and a pin 147 thereon, by engagement with an underlying nose 148 on the lever 127, effects an actuation of the lever 127 and, therefore, also an operation of the lever 122. The bail arm 135 descends idly with respect to the key stem 131 of the key I, by reason of the pin and slot connection 135, 137. An upward reach 150 of the bail arm 141, see Figures 4 and 10, lends to the key F lateral stability, said reach 150 being straddled by a forked portion 151 bent off laterally from the key leg 140.

From the foregoing, it will be clear that upon depression of any one of several carriage return keys there ensues always a power operated clutching operation for the carriage return drive.

For effecting returns under control of the key S, the latter need merely close the carriage return clutch inasmuch as the counterstop 62 is normally the proper location or elevation for intercepting the carriage by cooperation with the short return defining stop 56S. For properly controlling the return of the carriage to intermediate and full return positions, as defined respectively by the stops 56I and 56F there is effected in response to the operation of the keys I and F a relocation of the counterstop 62, respectively into cooperative range with the stops I and F. Such relocation is preferably effected by motor-power, through the agency of the same actuator 105 which has been described to close the carriage return clutch. To this end the upright counterstop arm 59 has near its lower end a pin 152 which has overlying an arm 153 of a transversely extending lever 154 pivoted as at 155 to an angular bracket 156, see Figure 4, rising upwardly from a cross member 157 of the machine framework. The lever 154 includes a rightwardly extending arm 158 overlying a differentially positionable link or slide 160 reaching to the front of the machine and having an ear posed directly in front of the upright arm 145 of the bail 136. Normally said slide rests at the rear, as at 162, slidingly upon the frame cross member 157 and at the front it is guided in a perforation of the key guiding comb 51, see Figure 1. Upon each operation of the actuator 105, as hereinbefore stated, the bell crank 108 is operated, the throw being imparted to the bell crank 108 being uniform at all times. Said bell crank 108 has a stepped branch 163 which with the slide 160 located in two positions progressively more forward than the one shown in Figure 1, is capable to impart movements of proper magnitude to the lever 154 to position of the counterstop 62 variously for carriage-return terminating engagement respectively with the stops I and F. More specifically stated, the slide 160 is formed with two ears 164, 165, extending transversely of the machine and reaching into the operating plane of the stepped bell-crank branch 163. Normally the slide occupies a rearmost position, seen in Figures 1 and 4, under the tension of a spring 166, and such position is defined by the bail arm 145 resting against the front of the bar 146. The ears 164, 165 have such relation with the stepped branch 163 that the slide 160 will not be receptive of any motion from the stepped branch 163 if the carriage return key S is operated, it being understood that operation of this key leaves the slide 160 in its normal rearmost position. This is clearly illustrated in Figure 9, wherein the mechanism leading to the carriage return clutch is shown in operated position and wherein the stepped branch 163 has been operated, without effect on the slide 160. Upon depression of the return key S there follows thus a return which is terminated by the cooperation of the stop 56$^S$ and the counterstop 62.

Operation of key I, to call into operation a power return to an intermediate position, as defined by the stop 56$^I$, results in a forward displacement of the slide 160 to an extent that will place the ear 164 over the higher one of the two steps on the stepped branch 163, see Figure 8. The slide 160 is then receptive of an upward movement by the bell crank 108 sufficient to lower the counterstop into cooperative range with the stop 56$^I$ and out of range with the stop 56$^S$. From Figure 8, it will be perceived that the forward movement of the slide 160 is gaged indirectly by abutment of the lower side of the lever 127 with the top of the bar 146, the lengths of arms 135, 145, being proportioned to give the slide 160 the appropriate forward displacement. It will thus be perceived that depression of the key I is followed by a power return terminated by engagement of the stop 56$^I$ with the counterstop 62.

The extent of depression of also the key F is governed by engagement of the lever 127 with the top of bar 146. The bail 136 when operated by the key F acts upon the lever 127 at a point which is relatively close to the bail axis, by means of the pin 147 engaging the nose 148 on the lever 127. It will be observed from Figures 7 and 8, that the bail 136 is capable of operation through a greater arc when the key F is operated, as compared with when the key I is operated. This is because the key F acts on the limitedly operable lever 127 through the connection 167, 168, whereas the key I acts on the lever by the connection 132, 133. The relatively great movement of the bail arm 145 received under control of key F places the slide ear 165 over the lower step on the stepped branch 163. This lower step being at greater length from the pivot of the bell crank 108 than the said upper step, it follows that upon clutch closing operation effected by the actuator 105, the rear end of slide 160 will receive a greater lift. This greater lift is of proper magnitude to lower the counterstop 62 into cooperative range with the extreme return stop 56$^F$ and clear of cooperative range of the stops 56$^I$ and 56$^S$. It will be observed that the actuator 105, the bell crank 108, the rear end of the slide 160, and the lever 154 constitute a singular power-actuating or positioning mechanism for the counterstop arm 59, that is, these parts constitute a power-actuating mechanism which is not of a multiple nature.

The carriage return clutching operation is slightly delayed in each instance in that the snatch pawl 120 has capacity for a limited pivotal movement on the actuator to crowd itself into engagement with the power drive shaft 42 by reacting against the angular front edge of the plate 44. Such initial pivotal displacement of the snatch pawl without imparting movement to the actuator, gives the slide 160 time to assume its proper differential position over the stepped branch 163, preparatory to counterstop setting operation by the latter. The counterstop 59 is given a slightly excessive downward movement, inasmuch as the clutch-closing element 114 with its shoulder 114$^a$ is given an excessive throw, see Figure 6, to assure an opportunity for the latch arm 129 to move to effective position. Thereafter, the power-operated parts, including also the counterstop 59, 62, settle back slightly under the tension of the spring 117. The final and accurately set position of the counterstop is secured as said parts settle back, preferably by a dog 172 in cooperation with one or another of two ratchet teeth 171 on the counterstop, the lower one of these teeth being engaged by the dog 172 when the counterstop settles to position for intermediate returns, and the upper tooth being engaged with the dog when the counterstop settles to position for full returns. Said dog 172 is normally held clear of said ratchet teeth, as in Figures 1 and 4, such position being normally prevalent due to a pitman 179, having at its right end a connection with the element 114 of the clutch controlling mechanism, and being at its left end associated with the dog 172 by a pin and slot connection 173. A light spring 174, see Figure 4, moves the dog yieldingly to effective position whenever the carriage return clutch is being closed and the element 114 receives a clockwise movement, as seen in Figure 6. The position of counterstop, as variably determined in response to the operation of several carriage return keys, thus prevails as long as the carriage return clutch remains closed; that is, as long as the latch member 129 holds the clutch in closed position. The dog 172 is pivoted on a lever 205 but for no other reason but that this lever provides a convenient means of support.

The termination or shut off of the carriage return occurs automatically as the active carriage-return stop, into cooperative range of which is counterstop 62 has been set, runs against the latter. Preferably the shut off is affected by two supplemental movements, one such movement being obtained incidental to the operation of the line-spacing mechanism, and the other by a slight displacement of the counterstop 62 by the selected return stop. The requisite for clutch opening is thus that the line-spacing mechanism must be actuated and that the carriage must be moved to returned position. The latch member 129 for holding the return clutch closed, has an upright arm 175 whereto a link 176 of a toggle comprising also another link 177 is linked. The left end of the toggle link 177 is joined to a link 182 by means of a pin and slot connection 181 and the link 182 has a pivotal connection at 183 with the counterstop arm 59. Said link 182 reaches leftwardly into a vertical guide-slot 184 provided in the housing 61 and rests on a shelf 185 constituting part of a bracket 186 having a slotted branch 187, see Figure 3, for guiding the counterstop arm 59 transversely of the machine. The toggle link 177 has an upwardly facing nose 188 and the various movable parts just described are normally in positions best seen in Figure 3.

In consequence to the closure of the carriage-return clutch, as has been stated hereinbefore, the latch member 129 assumes the position seen in Figure 6. This flexes the toggle 176, 177 upwardly so that the toggle nose 188 is then substantially directly underneath a control bar 190. The latter is mounted for downward movement on the platen carriage against the tension of a spring 191, see Figure 2, the bar being provided at opposite ends with diagonal slots 192 accommodating mounting pins 193 projecting forwardly from a conventional tabulator rack 194 of the machine. While the bar 190 still remains in normal position, the counterstop 62 under the tension of the spring 65 continues to rest against the right side of the perforation 58 in the housing plate 60. It may be noted that regardless of the elevation selected for the counterstop, the extended position of the toggle will be substantially the same because the point of articulation 183 is shifted only over a short range centered substantially at the level of the pin and slot connection 181. It has been stated that upon closure of the clutch, the line-spacing mechanism will be actuated by a limited rotation of the pulley 86. At the end of such limited rotation, a pin 195 on the pulley 86 engages a hook-shaped end 196 of the control bar 190 to displace the latter diagonally downward. Since the toggle link nose 188 underlies the control bar, the nose will be pressed downwardly and the toggle 176, 177 will become nearly straightened and, through the link 182, will position the counterstop 62 to lie against the left side of the opening 58. While this takes place, the latch 129 of the clutch control remains effective, the spring 129ᵃ for said latch being more powerful than the spring 65 associated with the counterstop. Inasmuch as the draw band 76 continues to pull upon the pulley 86 during the entire return of the carriage, it follows that the control bar 190 remains operated throughout the carriage-returning operation. As the carriage approaches its returned position defined by the selected carriage return stop, the counterstop receives a rightward displacement and the toggle, by being prevented from buckling upwardly by the operated control bar 190, transmits a releasing movement to the latch 129. This allows movement of the carriage-return clutch to open clutch position under the power of the spring 117 and thus terminates the return of the carriage, it being remembered that the clutch-closing actuator 105 returns to normal position immediately after operation.

From the above, it will be understood that an actuation of the control bar 190, as well as a rightward movement of the counterstop 62 is required to cause clutch opening. In the event that at the time of clutch closure one of the return stops is in engagement with the counterstop, the latch lever 129, due to such clutch closure, will flex the toggle 176, 177 upwardly, and, the counterstop being then in its rightward position, the immediate operation of line-spacing mechanism with the accompanying depression of control bar 190, will cause the restoration of latch 129 to clutch-opening position.

The pin-and-slot connection 181 between the toggle link 177 and the link 182 is to allow displacement of the counterstop leftwardly by the line-end stop 57, such displacement being utilized to operate a mechanism, hereinafter described, for suppressing typing when the carriage reaches the line end defined by the stop 57.

At the conclusion of every power return of the carriage, the clutch-controlling mechanism assumes the normal, open-clutch position and the pitman 179 is drawn rightwardly to cast off the dog 172, thereby freeing the counterstop arm 59 for restoration to uppermost position by the spring 65. The normal condition of the machine is thus re-established.

If a power return is past the return stop 56ˢ, the counterstop during a subsequent advance in letter-feed direction will be meeting up with this stop and possibly also stop 56ᴵ. For this reason the return stops have inclined undersides 198 which will deflect the counterstops during carriage advance. The underside 198 of the return stop 56ᴵ is shown to have an inclined cam extension 200 in the form of a plate attached to the rear of the stop and permitting adjustment of the return stop 56ᶠ on the rack 55 into close adjacency with the stop 56ᴵ. The downward displacement of the counterstop effected by said inclines 198 and the extension 200 is very gradual so as not to impede detrimentally the letter-feed of the carriage.

It will be perceived that in differentiation from the structure disclosed in said patent to Helmond, the carriage return clutch of the instant structure is closed positively by motor power and is thereafter held closed positively by a latch. For this reason the drive faces of the opposite clutch teeth of the gear 72 and the collar 77 can be beveled considerably to permit ease of disengagement of the clutch under the power of the spring 117 when the latch member 129 is automatically released at the conclusion of the return. In other words, the torque transmitted across the opposite clutch teeth during power returns is substantially not opposing the opening movement of the clutch, wherefore the release of the latch occurs against a minimum of resistance. The mechanism of the invention provides thus for more dependable closure and opening of the carriage return drive.

In certain classes of billing the return of the carriage is nearly always to the same specific position, and only occasionally to other return positions. For example, where the first column on a bill is the "Date" column, and there are usually to be made several entries under the same date, the most frequently required return of the carriage may be to a column just short of extreme return position. In other cases where successive entries are usually made at different dates, the most prevalent return may be to an extreme return position. Still in other cases it may be nearly always desired to return the carriage to another column-defining return position.

The machine of the invention includes means whereby the carriage, upon reaching a certain position in its advance, is caused to return automatically, without special attention by the operator, to a particular one of the positions defined by the stops 56ᶠ, 56ᴵ, 56ˢ, the particular position being predeterminable by simple means.

Referring now more particularly to Figure 3, it is seen that the line-end stop 57 shown in this figure is equipped with a plate 201, having bevel or cam edge 202 which, as the stop 57 approaches the counterstop 62 will cam the latter downwardly below cooperative range with the return stop 56ˢ, into line with the intermediate return stop 56ᴵ. Where the work requires most frequently a full return of the carriage, the line-end stop 57 is equipped with a plate 201 that has a cam edge 203 devised to depress the counterstop into cooperative range with the carriage return stop 56ᶠ, see Figure 15. If the return of the carriage is to be most frequently to the position defined by the stop 56ˢ, there need not be a cam plate 201 as the counterstop is normally in cooperative position with respect to this stop, see Figure 16.

In any event, as the stop face 204 of the line end stop 57 engages the counterstop 62, the counterstop is in the cooperative range of the proper return stop and is subsequently swung leftwardly within the opening 55 for inciting closure of the carriage-return clutch, preferably by causing a power operation of the clutch-closing actuator 105, in a manner presently to be described.

On the stud 63 whereon the counterstop arm 59 is swingable, there is pivotally mounted a lever 205 comprising an up-reaching arm 206 and an arm 207 reaching leftwardly. The lever 205 is operated by the displacement of counterstop 62 effected at line ends, by means of a pin 201 on the counterstop arm 59. The lever arm 207 ends at the right in a finger normally overlying directly a rearward branch 211 of the engaging lever 122 for the actuator 105. A spring leaf 212 normally held upon the arm 207 to partake in its movements, underlies resiliently the said lever branch 211, and when the counterstop arm is being displaced leftwardly at line ends, said lever branch 211 is acted upon by said spring leaf 212 to engage the actuator 105 for operation by the constantly driven power shaft 42. There ensues thus a clutch closing operation for the carriage return drive, via the aforedescribed train of parts 107, 108, 111 to 116 and 80 and 81. Inasmuch as the counterstop 62 assumes cooperative relation with the proper return stop as the carriage reaches the line end position, it follows that as a result of the clutch closure, the dog 172, if swung to effective position, will maintain said cooperative relation. Remembering here that closure of the clutch results in the movement of the dog 172 to effective position, it is clear that throughout the return of the carriage the counterstop is maintained in the cooperative range with the same return stop which is automatically selected at the outset of the return. As in the case of key-initiated returns, the latch member 129, upon the automatically effected closure of the clutch, associates itself with the shoulder 114ª to maintain the clutch closed. The behavior of the toggle 176 and 177 and associated mechanism thereafter is the same as in the case of key-initiated returns. Thus at the termination of the automatic returns, the counterstop receives a rightward displacement from the return stop engaged, and the dog 172 automatically withdraws from the teeth 171 on the counterstop arm 59, causing the counterstop to reassume its normal elevation shown in Figures 1, 3, and 4 under the tension of the spring 65.

As has been stated hereinbefore, the several carriage-return stops, as well as also the line-end stop 57 is adjustably locatable along a carriage-supported rack 55. Describing now in detail the structure of these stops, it will be seen from the drawings, see particularly Figures 1 and 3, that they are formed with a channel wherein the rack 55 is contained. The stops are in resilient contact with the rack bar along the lower side of the channel and each stop has a detent tooth-inset 213 for engagement in the notches of the rack bar. The channel in each stop affords along the top of bar 55 a clearance 214 wherein there is accommodated a bowed leaf spring 215, the clearance being such as to allow the stop to pivot against the tension of the spring 215 at a point 216 when pressure is applied upon the serrated finger hold 219. Pressure so applied frees the tooth 213 from the rack teeth and allows adjustment of the stop along the rack.

In the case of the line-end stop 57, if the cam plate 201 thereon were rigidly fastened upon the stop, the encounter of the counterstop 62 with the cam face 202 would be apt to swing the stop about the point 216 to released position. To prevent or counteract this, the cam plate 201 is carried upon the stop 57 by means of a pivot stud 217 and has a branch 218 provided with ears straddling the upper and lower side of the bar 55. It will be seen that by this arrangement an upward thrust on the cam plate 201 will tend to force the stop 57 into firmer interlock with the rack bar.

Cut-out of automatic return

When writing regular correspondence, the lines terminate unevenly and it is desired to effect the return of the carriage only under the control of the return keys. On the other hand, it is a desideratum that the operator be apprized of the approach of line end. The latter is most conveniently done under control of the line-end stop 57, which may sound a bell, not shown, a few letter-feed spaces before the engagement of the counterstop by the line-end stop, this constituting a first warning. If then typing is continued until the counterstop is displaced by the line-end stop 57, the typing instrumentalities are rendered inoperative in substantially the manner disclosed in the application of Harry C. Yeager, Serial Number 470,868, filed December 31, 1942, which matured as Patent No. 2,362,229 November 7, 1944. In order that the actuator-engaging lever 122 may remain unaffected by the displacement of the counterstop 62, the leaf spring underlying the lever arm 211 is adapted to be incapacitated. To this end the leaf spring 212 is pivotally carried on the arm 207 by a stud 220, but is adapted to be either propped up or lowered under control of a manipulative member 221, having an accessible finger piece 222. Said manipulative member at the left end has a pin-and-slot connection 223 with the lever arm 207 and presents a nose 224 to the spring 212. When automatic carriage returns are to ensue at the line ends, the manipulative member 221 is set to the position seen in Figures 3 and 14 and the nose then maintains the spring 212 in contact with said lever arm 211. If automatic returns are not desired, as when doing regular correspondence, the manipulative member 221 is slid leftwardly to the position seen in Figures 6 and 11, wherein the nose 224 enters an angular bend 225 in the spring, such bend providing for a drop of the spring about the pivot stud 220, away from the lever arm 211. Thus, with the setting of manipulative member 221 as seen in Figure 11, the displacement of counterstop leftwardly by the line-end stop 57, in accordance with the showing in said figure, has no effect on the lever 122, and thus also no effect on the clutch-closing actuator 105. The manipulative member 221 is supported and guided at its right end in a perforation 226 provided on the machine wall 20. During actuation of the lever 205, said manipulative member swings idly about the location of said perforation.

Line-end and safety locks

When the carriage approaches the travelling limit as defined by the line-end margin stop 57, the counterstop 62 is displaced leftwardly as explained hereinbefore. Regardless of whether the machine is conditioned for automatic returns or for correspondence work, the leftward displacement of the counterstop causes an actuation of a toothed line-end lock slide 227 so that teeth 228 thereof will slide to a position underneath the rear ends of the type action actuators 32. The lock slide is slidably accommodated, as at 230, on top of the bar 50, and is normally so positioned that its teeth 228 are situated between the working paths of the rear ends of the actuator links. The counterstop 59 transmits motion to said slide by means of a lever 231 pivoted upon a stud 232 rising from the cross bar 157 of the machine. Said lever 231 is forked at the rear to straddle the counterstop arm 59 and, at the front, is kept resiliently in engagement with an ear 233 by a tensile spring 234 anchored oppositely to said lever and said slide. Under normal conditions, the lever 231, when actuated, will displace the slide 227, said ear 233 being maintained in constant contact with the lever; but, should the slide 73 be obstructed in its movement, the spring 234 will yield temporarily. The carriage letter-feeds following the disengagement of the last-actuated type actuator 32, that is, after such actuator has been elevated clear of the power shaft 42. It will thus be seen that in the normal operation of the machine, the returning type-actuators 32 allow the unobstructed movement of the lock slide 227 to effective locking position, regardless of whether the operator may linger on the last operated key.

Should the manipulative member 221 be set for elimination of automatic returns and should it be desired to type beyond the margin defined by the stop 57, the operator may depress a margin release key 234, schematically shown in Figure 11, and having a rear-end 235 for operating the counterstop setting lever 154 counterclockwise. If such margin release key is operated, see Figures 3, 4, and 11 the counterstop 62 is withdrawn substantially flush with the plate 60 and is ineffective to restrict the range of carriage movement.

In the case of automatically initiated carriage returns, the lock slide 227 will be held in operated position during the entire return of the carriage, since during such return the counterstop 62, after operation by the line-end stop 57, is maintained in its leftward position by the action of the control bar 190 on the toggle 176, 177. When the carriage is returned under control of one of the carriage return keys, said lock slide 227 will be actuated in consequence of the operation of the control bar 190, incidental to the line spacing operation, which always precedes the return of the carriage.

Besides suppressing typing during carriage returns, it is also desired to suppress or make infeasible certain other operations such as back spacing, tabulating. Vice versa it is desired that carriage returns can only be instituted if such keys as the back spacing key, the tabulator key and the margin release key are in normal position. To this end, the bar 146 at the bottom of the key-lever comb plate comprises an elongate cage for a series of blocks 236, 237. Said cage is closed up at each end, as at 238, and the actuator engaging lever 122, by entering between two of the blocks 237, is adapted to crowd all the other blocks 236, 237 against each other. The blocks numbered 237 are in the form of rolls, whereas the block 236, consists of a bar which is nearly co-extensive with the breadth of the keyboard. A plate 240 retains said blocks in the cage 146 and the cage has operating clearances 244 for the lever 122 and other parts, such as a tabulator-key-operated part 241, a part 242 connected to a tabulator-stop-setting key, not shown, and a back-space-key operated part 243, each of these parts being adapted to crowd said blocks by entrance between two of them. It will thus be perceived that when such special functions as tabulating, tabulator stop setting, and back spacing are being performed, the actuator engaging element 122 is blocked against operation and that, therefore, also the several carriage return keys are inoperable. Should any of the said special functions be in progress as the line-end stop 57 encounters the counterstop 62 for instituting an automatic return, the operation of the actuator engaging lever 122 will be delayed until said lever is given the opportunity to enter between the blocks 237. Such delay is facilitated by the provision of the spring leaf 212 which will temporarily yield. Once the lever 122 is operated, the elements 241, 242, 243 associated respectively with the tabulating key mechanism, the tabulator stop-setting-mechanism and the back spacing key are blocked against operation.

To assure maintenance of the lever 122 in operated position throughout any return, whether manually or automatically initiated, the arm 116 on the yoke shaft 80 of the carriage return clutch has integral therewith an arm 245 having a link 246 articulated thereto and extending through a slot 248 in the right hand wall of the machine. Said link normally underlies idly the arm 211 of the actuator-engaging lever 122 and has a cam face 250 by reason of which the link is raised during clutch closure thereby to assure maintenance of the arm 211 in operated position throughout returns, especially during returns which are instituted by the return keys with the machine conditioned for regular correspondence, that is with the spring uncommunicative with the lever 122. This assures always maintenance of the lever 122 in operated position following closure of the carriage return clutch and pending the return of the carriage.

Although it is highly desirable to suppress operation of the tabulator key or keys, the back spacing key and the tabulator stop set-key when the carriage has reached the line-end position and an automatic return has been instituted, the operation of such keys must not be suppressed when the carriage reaches line end position in doing regular correspondence, that is, when the counterstop 62 is operated merely for actuating the line-end lock-slide 227. In this connection, it is important to note that setting of the manipulative member 221 to the position seen in Figure 11, for disabling the automatic carriage return instituting mechanism, also prevents the locking of said special function keys. This is because the counterstop 62 is then incommunicative with the lever 122 so that the latter will not enter between the locking blocks 237.

In Figure 17 is shown a rear elevation of a line end stop 57 having thereon a modified cam plate 251 for positioning the counterstop 62 as the carriage reaches the line end position. Said cam plate may be located on the rear of the stop 57 in three different positions by means of a headed screw 252 having a thickened section 253 underneath the head for entrance into any one of the three enlargements 254 in a slot 255 of the plate. The screw 252 is partially screwed out for shifting the cam plate, the slot 255 being large enough to be slid transversely to the screw shank. In the full line position of the plate shown, the latter is capable of setting the counterstop for intercepting the carriage in cooperation with the return stop 56$^F$. Two other plate positions are indicated by dot and dash lines, one being to set the counterstop for cooperation with the carriage return stop 56$^I$ and the other being merely to render the cam inoperative. One plate thus serves to control the position to which the carriage is to be automatically returned. As in the case of the exchangeable plates 203, the plate 251 is mounted pivotally, namely by the screw 252, so that upward thrust on the under side of the cam face, by reason of the branch 218 will have no tendency to throw the stop out of detented association with the rack bar.

While the form of mechanisms herein shown and described is admirably adapted to fulfill the objects stated, it is to be understood that it is not intended to confine the invention to the form or embodiment herein described, for the invention is susceptible of embodiment in various forms, all coming within the scope of the claims which follow.

What is claimed is:

1. In a business machine having a frame and having a carriage movable on said frame, a motor, a normally open carriage-return-drive intermediate said motor and said carriage, a plurality of carriage return stops, a counterstop mounted for different settings transversely of carriage movement from a normal position, said return stops and the counterstop being oppositely associated with the frame and the carriage, one of said return stops being normally in return-stopping range with said counterstop and the other return stops being arranged so that in each different setting given to the counterstop there will be another of said return stops in return-stopping range with the counterstop, power means, capable of varying operations, either to close said return-drive or to close said return-drive and concomitantly to give said counterstop one of said settings, and means to render said power means selectively effective for said varying operations, said power means comprising a single power actuator.

2. In a business machine having a frame and having carriage movable on said frame, a motor, a drive for returning said carriage, a normally open carriage return clutch intermediate said motor and said drive, a plurality of carriage return stops, a counterstop mounted for different settings transversely of carriage movement, said return stops being arranged so that in each setting of said counterstop there will be a different return stop in carriage return stopping range with the counterstop, means to set said counterstop selectively, and concomitantly to close said carriage return clutch, said last means comprising, key-means capable of selective operation, and power devices comprising a single power actuator, variously controllable by selective operation of said key-means, to close said clutch and to effect various selective power-settings of said counterstop, and means responsive to the return limiting encounter of any of said return stops with said counterstop to open said carriage return clutch.

3. In a business machine having a frame member and having a carriage member movable on said frame member, means to advance the carriage in one direction, normally ineffective power return means for said carriage member, carriage return terminating abutments, oppositely on the carriage member and said frame member, arranged and selectable variously for cooperation to establish different limits of return for the carriage, means to render said power return means automatically ineffective as the carriage member reaches any of said selectively established limits of return, and means including control means on one of said members, adapted by reason of carriage travel to effectuate automatically said power return means and to effect automatically a particular return-defining selection of said abutments, said control means comprising a carriage return initiating element and means capable of different association with said element for predetermining different return-defining cooperative selections of said abutments.

4. In a business machine having a frame member and a carriage member movable on said frame member, means to advance said carriage member in one direction, normally ineffective power return means for said carriage member, a plurality of return stops on one of said members, a counterstop supported on the other member for different settings transversely of the carriage member and for restricted movement in opposite directions parallel with the carriage, said return stops being arranged so that in each setting of said counterstop there will be a different return stop in cooperative range with the counterstop, means to set said counterstop selectively to said positions and concomitantly to render said power return means effective, means whereby during power returns of the carriage said counterstop is movable in one of said opposite directions by whichever return stop is cooperative, and means to render said power return means automatically ineffective responsive to movement of said counterstop on its supporting member in said one direction by the cooperative return stop at the end of the carriage return.

5. In a business machine having a frame member and having a carriage member movable in advance and in return direction on said frame member, means to advance said carriage member on said frame member, normally ineffective power return means for said carriage member, a plurality of carriage return stops on one of said members, a counterstop supported on the other one of said members for different settings transversely of the carriage member and for restricted movement in opposite directions parallel with the carriage member, said return stops being arranged so that in each setting of said counterstop there will be a different return stop in cooperative range with said counterstop, a carriage return initiating stop also on said other member, said counterstop being movable in one of said opposite directions by said return-initiating stop and in the other direction by which ever return stop may be cooperative with the counterstop, means to render said power return means effective and ineffective respectively by said opposite movements of said counterstop, and carriage controlled means for automatically giving said counterstop one of said settings.

6. In a business machine having a frame member and a carriage member movable on said frame member, means to advance said carriage member in one direction, normally ineffective power return means for said carriage member, a plurality of return stops on one of said members, a counterstop supported on the other member for different settings transversely of the carriage member and for restricted movement in opposite directions parallel with the carriage, said return stops being arranged so that in each setting of said counterstop there will be a different return stop in cooperative range with the counterstop, means to give said counterstop selectively said different settings and concomitantly to render said power return means effective, said giving means comprising, means capable of selective operation, and normally quiescent power setting means variously responsive to the selectively operable means to set said counterstop, means whereby during power returns of the carriage said counterstop is movable in one of said opposite directions by which ever return stop is cooperatvie, and means to render said power return means automatically ineffective responsive to movement of said counterstop on its supporting member by the cooperative return stop at the end of the carriage return.

7. In a business machine having a frame member and having a carriage member movable on said frame member in advance and return directions, means to advance said carriage member on said frame member, normally ineffective power return means for said carriage member, a plurality of carriage return stops on one of said members, a counterstop arm extending transversely of the carriage member and supported on the other one of said members for different settings transversely of the carriage member and for restricted swinging movement of a counterstop end thereon in parallel to the carriage member, said return stops being arranged so that in each setting of said counterstop arm, there will be a different return stop in cooperative range with said counterstop end, means to give said counterstop arm said different settings selectively, and concomitantly to render said power return means effective, means whereby during the return of the carriage and counterstop arm is swingable in one of said opposite directions through engagement of its counterstop and with whatever return stop may be in cooperative range therewith, and means to render said power return means automatically ineffective when said counterstop arm is swung in the said one direction by any cooperative return stop during power return of the carriage.

8. In a business machine having a frame and having a carriage movable on said frame, means to advance the carriage in one direction, normally ineffective power returning means for said carriage, means to effectuate said power returning means automatically upon advance of the carriage to a return initiating position, stop means and a counterstop oppositely on the carriage and said frame, said counterstop being settable to different return selecting position transversely of the carriage and said stop means comprising for every set position of the counterstop a different return-position-defining stop in return limiting range with the counterstop, means biasing said counterstop toward normal position, means including an element on the carriage to effect movement of the said counterstop to one of said set positions in response to movement of the carriage through a certain zone, means to hold said counterstop automatically following movement to the said set position, and means to render said power returning means automatically ineffective at the conclusion of each limited return and concomitantly to release said holding means for return of the counterstop to normal position.

9. In a business machine having a frame and having a carriage movable on said frame, a motor drive for returning said carriage including a normally open carriage return clutch, stop means and a counterstop oppositely on the carriage and said frame, said counterstop being settable from a normal position to different return selecting positions, transversely of the carriage, and said stop means comprising for every said position of the counterstop a different return-position- defining stop in return limiting range with the counterstop, means resiliently influencing said counterstop toward normal position, carriage controlling mechanism movable from an open to a closed clutch position, means including control means on the carriage, effective at line ends, to cause movement of said clutch controlling mechanism from open to closed clutch position and to effect a movement of said counterstop to one of the said set positions, means actuated by said clutch controlling mechanism to hold said counterstop set while the clutch controlling mechanism is in closed clutch position, and means to effect movement of said clutch controlling mechanism from closed to open clutch position responsive to a return limiting encounter of any of the return stops with said counterstop, whereby said holding means is rendered ineffective at the end of each return and whereby said counterstop is then free to assume its normal position.

10. In a typewriter having a frame and having a carriage movable on said frame, means to advance the carriage in one direction, two elements, oppositely on the frame and the carriage, one operable by the other incidental to the carriage advancing to a certain position, normally ineffective power means for returning the carriage, typing instrumentalities, including type-keys, means operable to lock said typing instrumentalities against effective operation, keys other than the type keys, other locking means operable for locking said other keys, means responsive to operation of said one element by the other to render said power return means effective and to operate both said locking means, and manipulative means to render said responsive means incapable of rendering said power return means effective, and to render concomitantly said other locking means inoperative without also rendering the first said locking means inoperative.

11. In a typewriter having a frame and having a carriage movable on said frame, means to advance the carriage in one direction, two elements, oppositely on the frame and the carriage, one operable by the other incidental to the carriage advancing to a certain position, normally ineffective power means for returning the carriage, typing instrumentalities, including type-keys, means operable to lock said typing instrumentalities against effective operation, operable parts including a plurality of keys other than type-keys, another locking means effective upon operation of any one of said parts to lock the remainder of said parts against operation, means responsive to operation of said one element by the other, to render said power return means effective and substantially concomitantly to operate the first said locking means and one of said parts associated with the second locking means, and manipulative means to render said responsive means incapable of rendering said power return means effective, and concomitantly to render said responsive means unable to operate said one of said parts, but without also rendering it unable to operate said first said locking means.

12. In a business machine having a frame and having a carriage movable on said frame, abutments oppositely on said frame and said carriage, arranged for different relative positioning transversely of the carriage to establish different positions of arrest for the carriage, means including a member movable to various positions to effect different relative positioning of said abutments, a plurality of keys, a singular, normally ineffective power-positioning mechanism for said member, and means responsive to operation of different of said keys to render said singular power-positioning mechanism variously effective to power-move said member to said different positions.

13. In a business machine having a frame and having a carriage movable on said frame, a plurality of stops and a counterstop, oppositely on said frame and said carriage, said counterstop being mounted for movement to different positions transversely of the carriage, and said stops being arranged so that in each of the different positions of said counterstop there will be a different stop in carriage stopping range with said counterstop, a plurality of keys, a singular, normally ineffective power-setting mechanism for said counterstop, and means responsive to operation of different of said keys to render said singular power-setting mechanism variously effective to power-move said member to said different positions.

14. In a business machine having a frame and having a carriage movable on said frame, a plurality of stops and a counterstop, oppositely on said frame and said carriage, said counterstop being mounted for movement to different positions transversely of the carriage, and said stops being arranged so that in each of the different positions of said counterstop there will be a different stop in carriage-stopping range with said counterstop, a power operator, a sole, normally idle power-actuator capable of being transitorily connected with said operator to execute a uniform operating stroke, a plurality of keys, a singular mechanism operatively associating said actuator with said counterstop, and means to condition said mechanism variously by operation of different of said keys so that an operating stroke of the actuator is capable to act through the medium of said singular mechanism to move said counterstop to different of said positions in dependence of the particular key operated, and means to connect said actuator transitorily with said operator by operation of any of said keys.

15. In a business machine having a frame and having a carriage movable in opposite directions on said frame, normally ineffective motor means to move said carriage in at least one of said directions, abutments oppositely on said frame and said carriage, arranged for selective relative positioning transversely of the carriage to establish different limits to which said motor means may move the carriage in said one direction, means including a member movable from a normal position to different other positions to select said abutments variously for cooperation, selectively operable keys, power means responsive to different selective operation of said keys to move said member to different ones of said positions and to render said motor means ineffective, means to hold said member in said different positions upon power-movement thereto, said last means comprising a movable element to hold or release said member, means responsive to operation of any of said keys to effectuate said motor means for moving the carriage in said one direction, and means responsive to motor-movement of the carriage to any of the limits established by said abutments, to render said motor means ineffective and concomitantly to release said holding element and cause the return of said member to said normal position.

16. In a business machine having a carriage movable in opposite directions across said frame, normally ineffective motor means to move the carriage in at least one of said directions, a plurality of stops and a counterstop, oppositely on the frame and said carriage for variously limiting motor-movement of the carriage in said one direction, said counterstop being mounted for setting movement transversely of the carriage to different positions, and said stops being arranged so that in each setting of said counterstop there will be a different one of said stops in movement-limiting range with said counterstop, means for urging said counterstop to normal position, selectively operable keys, power means including a sole power actuator, responsive to different ones of said keys to move said counterstop to different ones of said positions, means to latch said counterstop upon setting movement to any one of said positions, said latching means comprising a latching member movable into and out of engagement with said counterstop, means responsive to operation of any one of said keys to effectuate said motor means for moving the carriage in said one direction, and means responsive to motor movement of the carriage to any of the established movement limits, to render said motor means automatically ineffective and concomitantly to release said latching member and to cause the return of the counterstop to normal position by said urging means.

17. In a business machine having a frame and having a carriage movable in letter-feed and return direction on said frame, carriage return terminating abutments oppositely on said frame and said carriage, arranged for selective relative positioning transversely of the carriage to establish different limits of return for the carriage, normally ineffective motor means for returning the carriage, means including a member movable to various positions to select said abutments variously for cooperation, selectively operable control means, means comprising a sole, normally idle power actuator, responsive to different selective operations of said control means to move said member to different of said various positions by power derived from the said sole actuator, means to hold said member upon movement to said various positions, means to effectuate said motor means in response to each selective operation of said control means, and means responsive to each carriage-return-limiting encounter of said abutments to render said motor means ineffective and to release said holding means.

18. In a business machine having a frame and having a carriage movable in letter-feed and return direction on said frame, a plurality of carriage return stops and a carriage return counterstop, oppositely on the frame and the carriage, said counterstop being mounted for different settings transversely of carriage movement, and said stops being arranged so that in each different setting of said counterstop there will be a different stop in carriage-return-limiting range with said counterstop, normally ineffective motor means for returning the carriage, means to set said counterstop selectively into stopping range with said different carriage stops, comprising, key-means capable of selective operation, power means responsive to any of said selective operations of said key-means to effect a single operating stroke, and means operable by said power means and variously controllable by selective operation of said key-means to cause different power settings of said counterstop to be effected in response to different selective operations of said key-means, means to hold said counterstop in the power-set position, means to effectuate said motor means in response to each selective operation of said key-means, and means responsive to each carriage-return-limiting encounter of any stop with said counterstop to render said motor means ineffective and to cause said counterstop to restore.

19. In a business machine having a frame and having a carriage movable on said frame, means to advance the carriage in one direction, normally ineffective motor means to impart return movement to said carriage, abutments oppositely on said frame and said carriage, arranged for selective relative positioning transversely of the carriage, to establish different limits of return for said carriage, selectively operable control means, and means comprising a sole, normally idle power actuator, responsive to different selective operations of said control means to effectuate said motor means and concomitantly to position said abutments selectively by power derived from said sole actuator.

20. In a business machine having a frame and having a carriage movable on said frame, means to advance the carriage in one direction, normally ineffective motor means to return the carriage in the other direction, carriage return terminating abutments oppositely on the carriage and said frame adapted to define at least two different limits of return by selection of different abutments for cooperation, a pair of said abutments being normally selected for cooperation to define a normal limit of return, and a pair of abutments being selectable for cooperation to define another limit of return, power means capable of varying operations, either to effectuate said motor means, or to effectuate said motor means and concomitantly to select that pair of abutments for cooperation which defines said other limit of return, and means to render said power means selectively effective for said varying operations, said power means comprising a sole power actuator.

21. In a business machine having a frame and having a carriage movable on said frame, means to advance the carriage in one direction, normally ineffective motor means to return the carriage, abutments oppositely on the frame and said carriage, arranged and selectable variously for cooperation to establish different limits of return for the carriage, operable means, differentially conditionable so that in dependence of its condition, operation thereof will effect different cooperative selections of said abutments, a plurality of carriage return keys, operable selectively to differentially condition said operable means, power means adapted to be rendered effective to operate said conditionable means, and means responding to operation of any one of said keys after the conditioning of said conditionable means to render said power means effective.

22. In a business machine having a frame and having a carriage movable on said frame, means to advance the carriage in one direction, normally ineffective power return means for said carriage, means to effectuate said power return means automatically upon advance of the carriage to a return initiating position, stop means and a counterstop oppositely on the carriage on said frame, said counterstop being settable from a normal position to different return selecting positions, transversely of the carriage, and said stop means comprising for every set position of the counterstop an individual return-position-defining stop in return limiting range with the counterstop, means to render said power return means automatically ineffective at the conclusion of each limited return, means including selectively operable key-means to set said counterstop variously to said return selecting positions, and concomitantly to effectuate said power return means, means including an element on the carriage to set said counterstop to one of the said set positions in response to movement of the carriage through a certain zone, means operated automatically in consequence of each return-limiting cooperation of the counterstop with said stop means to render said power return means ineffective, and means controlled by said rendering means to cause restoration of said counterstop to said normal position.

23. In a business machine having a frame member and having a carriage member movable on said frame member, means to advance the carriage member in one direction, normally ineffective power return means for said carriage member, carriage return terminating abutments, oppositely on the carriage member and said frame member, arranged and selectable variously for cooperation to establish different limits of return for the carriage, means to render said power return means automatically ineffective as the carriage member reaches any of said selectively established limits of return, means including a control element predeterminedly settable to different positions in parallel with the direction of movement of said carriage member to cause automatically the effectuation of said carriage return means in response to advance movement of the carriage member to a particular position, and means comprising a device capable of different association with said predeterminedly settable control element, for predetermining different return-defining selections of said abutments.

24. In a business machine having a frame member and having a carriage member movable on said frame member, means to advance the carriage member in one direction, normally ineffective power return means for said carriage member, carriage return terminating abutments, oppositely on the carriage member and said frame member, arranged and selectable variously for cooperation to establish different limits of return for the carriage, means to render said power return means automatically ineffective as the carriage member reaches any of said selectively established limits of return, means including an element predeterminedly adjustable to different positions to cause effectuation of said power return means in response to the advance of the carriage to a particular position, and means comprising a member adjustable along with said element to effect automatically a particular return defining selection of said abutments in association with each power return of the carriage resulting from advance of the carriage to the said position.

HARRY C. YAEGER.

Certificate of Correction

Patent No. 2,393,441.                                            January 22, 1946.

HARRY C. YAEGER

It is hereby certified that error appears in the printed specification of the above numbered patent requiring correction as follows: Page 10, first column, line 31, for "and counterstop" read *said counterstop*; and that the said Letters Patent should be read with this correction therein that the same may conform to the record of the case in the Patent Office.

Signed and sealed this 14th day of May, A. D. 1946.

[SEAL]

LESLIE FRAZER,
*First Assistant Commissioner of Patents.*